United States Patent
Magidson et al.

(10) Patent No.: US 12,138,495 B2
(45) Date of Patent: *Nov. 12, 2024

(54) FILTER AND METHOD

(71) Applicant: Moldex-Metric, Inc., Culver City, CA (US)

(72) Inventors: Mark Magidson, Los Angeles, CA (US); Crest Turdjian, Los Angeles, CA (US)

(73) Assignee: Moldex-Metric, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,389

(22) Filed: Nov. 27, 2023

(65) Prior Publication Data

US 2024/0307713 A1  Sep. 19, 2024

Related U.S. Application Data

(63) Continuation of application No. 18/183,845, filed on Mar. 14, 2023, now Pat. No. 11,872,416.

(51) Int. Cl.
*A62B 23/02* (2006.01)
*B29C 51/02* (2006.01)
(Continued)

(52) U.S. Cl.
CPC .............. *A62B 23/02* (2013.01); *B29C 51/02* (2013.01); *B29C 51/145* (2013.01);
(Continued)

(58) Field of Classification Search
CPC ....... A62B 23/02; B29C 51/02; B29C 51/145; B29C 51/264; B29C 51/268; B29K 2023/12; B29K 2105/251; B29K 2507/04; B29L 2031/14; A41D 13/11; B01D 46/0001

See application file for complete search history.

(56) References Cited

U.S. PATENT DOCUMENTS 4,238,207 A * 12/1980 Ruschke ............. A61M 1/3627
  55/486
4,850,347 A    7/1989 Skov
(Continued)

FOREIGN PATENT DOCUMENTS

KR    20050057526 A * 6/2005

OTHER PUBLICATIONS

"International Application Serial No. PCT US2023 082905, International Search Report mailed Feb. 1, 2024", 3 pgs.
(Continued)

*Primary Examiner* — Tu A Vo
(74) *Attorney, Agent, or Firm* — Schwegman Lundberg & Woessner, P.A.

(57) ABSTRACT

An example method of making a filter for a respirator is provided. An example filter includes a pleated filter element and a preformed filter mounting element for mounting the filter to a face piece or respirator. The method forms a filter having an air impermeable seal extending around a periphery of the filter, the air impermeable seal including and bonded by melted plastic material of the pleated filter element and melted plastic material of the preformed filter mounting element.

30 Claims, 7 Drawing Sheets

(51) Int. Cl.
*B29C 51/14* (2006.01)
*B29C 51/26* (2006.01)
*B29K 23/00* (2006.01)
*B29K 105/00* (2006.01)
*B29K 507/04* (2006.01)
*B29L 31/14* (2006.01)

(52) U.S. Cl.
CPC .......... *B29C 51/264* (2013.01); *B29C 51/268* (2013.01); *B29K 2023/12* (2013.01); *B29K 2105/251* (2013.01); *B29K 2507/04* (2013.01); *B29L 2031/14* (2013.01)

(56) References Cited

U.S. PATENT DOCUMENTS

| | | | | |
|---|---|---|---|---|
| 5,240,479 | A * | 8/1993 | Bachinski | B01D 46/521 55/528 |
| 5,505,197 | A * | 4/1996 | Scholey | A62B 18/00 128/206.17 |
| 5,720,789 | A * | 2/1998 | Pinson | B01D 46/02 55/486 |
| 5,736,041 | A * | 4/1998 | Skov | B01D 46/522 55/DIG. 35 |
| 5,992,414 | A * | 11/1999 | Tayebi | A62B 7/10 128/206.16 |
| 6,161,540 | A | 12/2000 | Fecteau | |
| 6,364,978 | B1 * | 4/2002 | Skov | B01D 46/0001 156/499 |
| 11,872,416 | B1 * | 1/2024 | Magidson | A62B 23/02 |
| 2001/0054424 | A1 * | 12/2001 | Salapow | A62B 23/02 128/206.17 |
| 2003/0196750 | A1 * | 10/2003 | Sakai | B29C 65/7841 156/272.8 |
| 2005/0145249 | A1 * | 7/2005 | Solyntjes | A62B 23/02 128/206.16 |
| 2006/0219624 | A1 * | 10/2006 | Kuno | B01D 29/01 210/451 |
| 2006/0266364 | A1 * | 11/2006 | Turdjian | A41D 13/11 128/206.28 |
| 2007/0144123 | A1 * | 6/2007 | Angadjivand | A62B 23/02 55/486 |
| 2008/0060987 | A1 * | 3/2008 | Goto | B29C 66/324 210/231 |
| 2008/0169235 | A1 * | 7/2008 | Goto | B29C 66/12464 210/454 |
| 2010/0132712 | A1 * | 6/2010 | Mutze | A62B 23/02 128/206.17 |
| 2015/0314147 | A1 | 11/2015 | Fleming et al. | |
| 2015/0336718 | A1 * | 11/2015 | Dwyer | A62B 23/02 220/4.23 |
| 2018/0353783 | A1 * | 12/2018 | Dwyer | A62B 27/00 |
| 2021/0106937 | A1 | 4/2021 | Groth et al. | |
| 2021/0331000 | A1 | 10/2021 | Gilner et al. | |

OTHER PUBLICATIONS

"International Application Serial No. PCT US2023 082905, Written Opinion mailed Feb. 1, 2024", 14 pgs.

U.S. Appl. No. 18/183,845, filed Mar. 14, 2023, Filter and Method.

"U.S. Appl. No. 18/183,845, 312 Amendment filed Oct. 27, 2023", 11 pgs.

"U.S. Appl. No. 18/183,845, Examiner Interview Summary mailed Aug. 9, 2023", 2 pgs.

"U.S. Appl. No. 18/183,845, Non Final Office Action mailed Jun. 23, 2023", 44 pgs.

"U.S. Appl. No. 18/183,845, Notice of Allowance mailed Sep. 1, 2023", 27 pgs.

"U.S. Appl. No. 18/183,845, PTO Response to Rule 312 Communication mailed Nov. 13, 2023", 2 pgs.

"U.S. Appl. No. 18/183,845, Response filed Aug. 9, 2023 to Non Final Office Action mailed Jun. 23, 2023", 17 pgs.

* cited by examiner

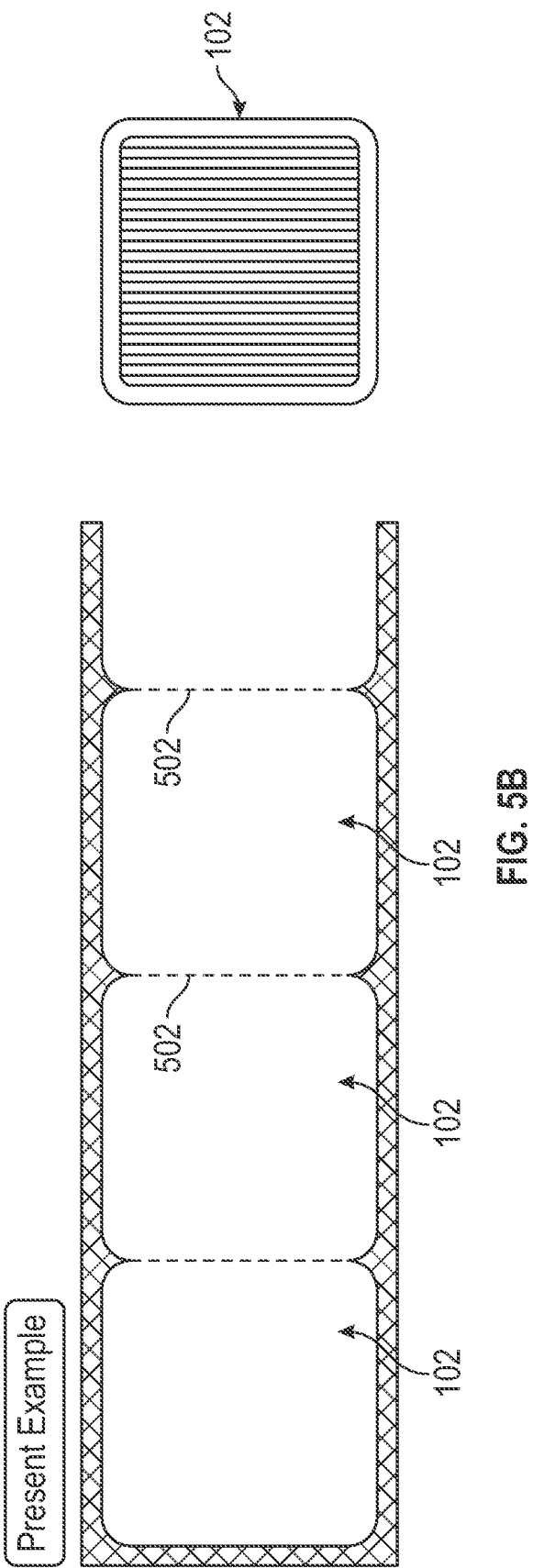

FILTER AND METHOD

CLAIM FOR PRIORITY

This application is a continuation of and claims the benefit of priority to U.S. application Ser. No. 18/183,845, filed Mar. 14, 2023, which is hereby incorporated by reference in its entirety.

TECHNICAL FIELD

The present disclosure relates to filters, filter elements, and improved methods of making such filters and filter elements. More specifically, substantially rectangular, pleated one-piece filters provide enhanced breathability and, being self-supporting and integrally formed, may be fitted with convenience without a cartridge or capsule to a respirator face piece or mask, for example. Particular examples include a filter element that includes parallelly folded filter material.

BACKGROUND

Filter elements that include parallelly folded filter material are sometimes used as replaceable units for insertion in capsules or cartridges of respirator face pieces. These filter elements may consist of a glass fiber fleece as the filter material which is arranged in parallel folds in the fashion of an accordion. In order to keep the folds open, i.e., to prevent the individual layers of the folds from lying one on top of the other during breathing and reducing desired air flow, either thin beads of adhesive or wax which extend in a direction transverse to the folds may be applied, with the adhesive materials penetrating into interspaces between the folds and keeping the folds open after having hardened, or the predetermined distance between the folds may be fixed by a seam with a thick yarn or like measures.

The outer circumference of the filter element can then be provided with a form-defining rim which is, e.g., made by inserting the filter material, which is arranged and fixed in folds, into a cartridge and by inserting a wax layer between filter and cartridge in a centrifugal process. Apart from the fact that the known filter element is difficult to make and rather expensive, the folds of the filter element have sharp filter material bends at which the risk arises that the filter material is weakened or even damaged by mechanical impact. Another filter element for respirator face pieces comprises a plurality of circular flat layers of a polymeric filter material which are interconnected along their outer circumferences by the application of heat and pressure. A predetermined number of filter material layers respectively form the upper side and lower side of an envelope which surrounds an inner space provided with a spacer. The spacer may be in the form of a non-woven padding and has a relatively low air flow resistance. The interior communicates with a breather tube of air-impermeable material which is detachably coupled with an adapter arranged on a molded mask body of a respirator face piece. The filtration surface area of this type of filter element is relatively small because of dimensional limitation. Larger diameter will affect or reduce the visual field of users. Hence, this type of filter element will have relatively lower filtration efficiency and higher breathing resistance.

U.S. Pat. No. 4,678,578 discloses a filter element that can replaceably be inserted into a filter housing. This filter element, however, is not used for respiratory face pieces with an intermittent suction, but in industrial filters for filtering continuous flows in the pharmaceutical, cosmetic, photographic, biochemical, or other industries. This filter element includes a folded filter element whose folds are kept open by cover layers. However, filter material, a cover layer, and, optionally, the envelopes have to be embedded in a compact extruded or punched frame of a plastic material, which increases the costs of the filter element.

U.S. Pat. No. 5,736,041 discloses a filter element that is of circular shape and lenticular cross section. The filter element requires fitting to a separate capsule or cartridge for support when worn, or in the alternative, welded in a separate operation to a bayonet element.

SUMMARY

In one aspect, a filter comprises a pleated filter element comprising a layer of flexible plastic netting material having a plurality of perforations allowing free passage of air through the perforations of the plastic netting material; a layer of polymeric filter media for filtering impurities in air passing through the filter; the layer of flexible plastic netting material and the layer of polymeric filter media positioned to lie one on top of the other to form a multilayer of flexible plastic netting material and polymeric filter media, the multilayer of flexible plastic netting material and polymeric filter media forming a pleated composite layer of flexible plastic netting material and polymeric filter media having an overall structure of continuous and adjacent pleated folds; and a preformed filter mounting element for direct mounting of the filter to a face piece or respirator, the preformed filter mounting element comprising a feature for connecting the filter to the face piece or respirator; a plenum devoid of the pleated filter element, the plenum defining a free volume allowing passage of unrestricted inhaled air into the face piece or respirator after the inhaled air has passed through the pleated filter element of the filter; and an air impermeable seal extending around a periphery of the filter, the air impermeable seal including and bonded by melted plastic material of the pleated filter element and melted plastic material of the preformed filter mounting element.

In some examples, the filter is a substantially rectangular filter.

In some examples, the layer of polymeric filter media is made of or includes polypropylene. In some examples, the layer of polymeric filter media includes carbon particles embedded therein. In some examples, the layer of polymeric filter media includes an electrostatically charged melt blown filter layer.

In some examples, the filter further comprises a first cover disposed on a first side of the pleated composite layer. In some examples, the filter further comprising a second cover disposed on a second side of the pleated composite layer.

In some examples, the preformed filter mounting element includes a preformed plastic material shaped to define a bayonet of the filter, the bayonet enabling direct mounting of the filter to a face piece or respirator. In some examples, the bayonet includes a mounting aperture surrounded by one or more locking formations for direct mounting of the filter to the face piece or respirator without intervention of a filter cartridge or filter capsule. In some examples, the plenum is located immediately adjacent the mounting aperture.

Other technical features may be apparent to one skilled in the art from the following figures, descriptions, and claims.

BRIEF DESCRIPTION OF THE DRAWINGS

FIG. 5A shows prior art aspects of filter cutting, while FIG. 5B shows aspects of filter cutting according to present example embodiments.

DETAILED DESCRIPTION

The term rectangular or "substantially rectangular" herein, as applied to a filter, is intended to denote a shape having right angles or a rectangular base, side, or sides. Some examples described herein are substantially rectangular in the sense that, at least in plan view, they include a rectangular shape including two or more right angles, but may have one side of a rectangle that is not necessarily linear. The non-linear side may include an arcuate shape or rounded corners, for example, for improved user visibility (e.g., a less obstructed field of view when a user wears a respirator or mask to which a rectangular filter has been fitted) or for other reasons. Nonetheless, significant advantages enabled by a substantially rectangular filter shape, such as manufacturing efficiency, high precision in forming filter shapes, and ease of breathability are still provided in such non-linear side examples. These and other advantages are discussed further below.

Figure 1A:
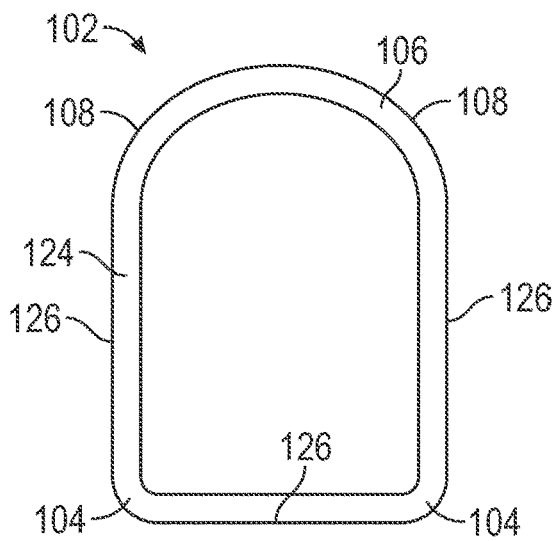
FIGS. 1A-1E respectively show top plan, right side, end, left side, and underside views of a filter, according to an example embodiment.
Figure 1B:
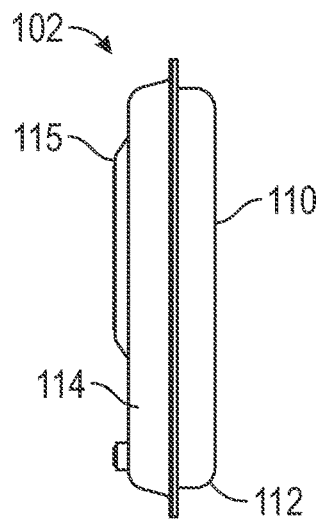

FIGS. 1A-1G show external views of a filter 102, according to an example embodiment. The filter 102 is substantially rectangular when viewed from above (e.g., as shown in FIG. 1A) while having rounded corners 104 and a non-linear side 106, as shown in that view. The filter 102 also has a substantially rectangular cross-section in a side or cross-sectional view (e.g., as shown in FIG. 1B, FIG. 1C, FIG. 1D, and FIG. 3) and is designed for replaceable fitment to a face piece, mask, or respirator, such as a respirator 202 shown in FIG. 2, for example. Other long term or temporary fitments to other respirators and/or full or half masks are possible. Instead of being fully square or rectangular (as is also possible in some present examples), the rounded shoulders 108 of the non-linear side 106 of the filter 102 can provide an advantage in that they provide unobstructed or improved lower fields of view over the nose of a user of the respirator 202 when worn (see FIG. 2, for example).

Figure 1C:
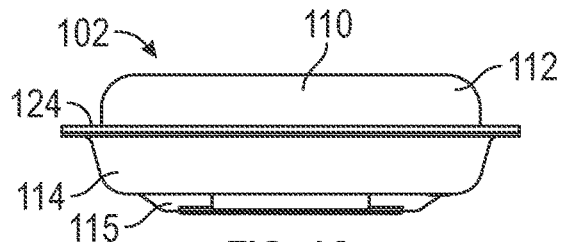
Figure 1D:
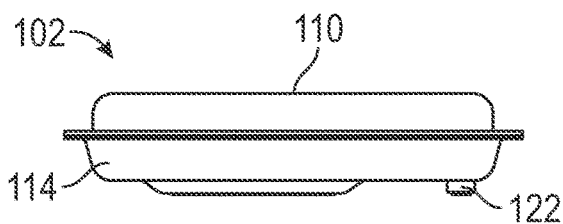
Figure 1E:
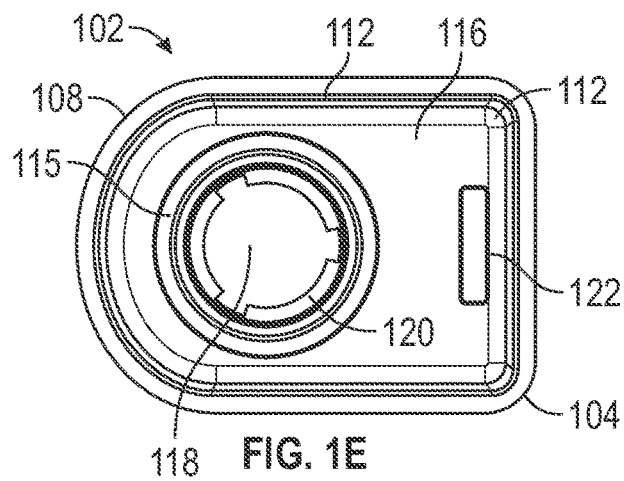
Figure 1F:
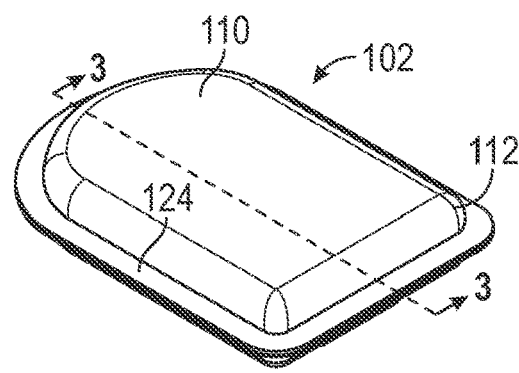
FIGS. 1F-1G show pictorial views of the filter of FIGS. 1A-1E.
Figure 1G:
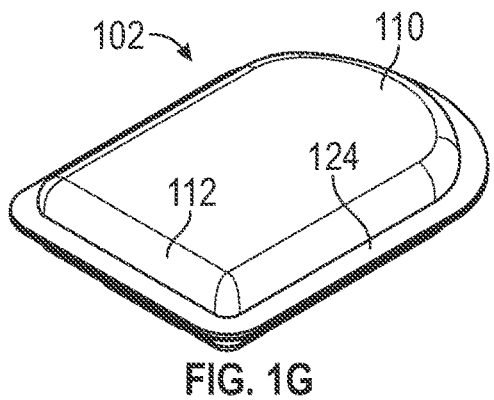

The illustrated filter 102 has a flexible, air permeable cover 110 which, in the illustrated example, also has rounded corners or a rounded profile 112 along edges of the cover 110, for example as shown along "upper" edges of the filter 102 in the orientation of the filter 102 shown in FIG. 1C, FIG. 1D, and FIG. 1F. The rounded profile 112 of the cover 110 may also be provided for reasons of improved visibility and/or user handling comfort in avoiding sharp edges, for example. In some examples, the cover 110 includes one or more layers of a spun bond material or soft fabric, described further below.

The filter 102 also includes a semi-rigid filter mounting element 114 preformed from a layer of plastic material, as described more fully below. In some examples, the preformed filter mounting element 114 includes features for mounting the filter 102 directly to a face piece or respirator without the need for a separate filter capsule or cartridge. In some examples, the preforming of the filter mounting element 114 includes creation of a raised bayonet 115 and mounting features for securing the filter 102 directly to a face piece or respirator. Other attachment arrangements or filter-securing features are possible.

In some examples, the filter mounting element 114 includes a semi-rigid backing or shell of plastic material. The filter mounting element 114 is self-supporting and includes a mounting aperture 118 (FIG. 1E) in the bayonet 115 allowing the passage of air therethrough. In the illustrated example, the mounting aperture 118 includes, or is at least surrounded by, mounting formations or features 120 enabling the filter 102 to be fitted to a face piece or respirator, as shown for example in FIG. 2. The filter 102 can be fitted to the respirator 202 without the use or intervention of a separate cartridge or capsule for support. The configuration of the mounting formations 120 around the mounting aperture 118 allows the filter 102 to be fitted to the respirator 202 in a convenient twist-lock manner. Other locking arrangements and/or configurations are possible. The example configuration of the filter mounting element 114 may include an optional embossment 122 bearing the name of a filter manufacturer or other party, for example.

The filter mounting element 114 includes a rim 124 to which outer or peripheral portions of the cover 110 (and/or other internal layers, described more fully below) are sealed in an airtight manner. In some examples, the rim 124 defines the rounded shoulders 108 of the non-linear side 106 of the filter 102, as well as the rounded corners 104 of the cover 110 described above. Other rim configurations are possible.

It will be appreciated that the provision of a tight seal between the filter 102 and the respirator 202 is important in air filtering applications. Air holes allowing entry of dust, particulates, and other contaminants is not desirable. To this end, the straight edges 126 of the substantially rectangular filter 102 can facilitate precise alignment of the aperture 118 and mounting formations 120 with respect to other dimensions of the filter 102 and/or the respirator 202, and/or with respect to other equipment during manufacturing. For example, a common straight edge 126 between two (or more) filters 102 may allow use of an efficient single-stroke or common cutting edge during manufacture of a series of filters 102, as is described more fully below.

With reference again to FIG. 2, the filter 102 is shown fitted to a respirator 202. The respirator 202 comprises a face piece 204 formed to separate the nose and the mouth of a user from an external environment when worn. The face piece 204 includes a flexible sealing lip 206 that faces the user and fits to the shape of the user's face in a gas-tight manner while the respirator 202 is pressed against the user's face. The face piece 204 also includes an opening (not visible in the view) disposed on the opposite side of the sealing lip 206 in which an exoskeleton 208 is supported. In some examples, the exoskeleton 208 is formed separately of the face piece 204, although in some examples the exoskeleton 208 is integrally formed with the face piece 204. In the illustrated example, the exoskeleton 208 includes a plurality of strap coupling elements 210, two in the illustrated instance, one on each side of the exoskeleton 208. The ends of a head strap (not shown) may be fitted to the strap coupling elements 210 and adjusted as desired.

The mounting formations 120 around the aperture 118 of the filter 102 engage in a twist-lock manner with complimentary formations on the exoskeleton 208 so that the filter 102 surrounds and covers an inhalation port (not visible) formed in the exoskeleton 208. In some examples, the filter 102 is sealed to the inhalation port by a gasket. Other gasket arrangements and filter configurations are possible.

Figure 2:
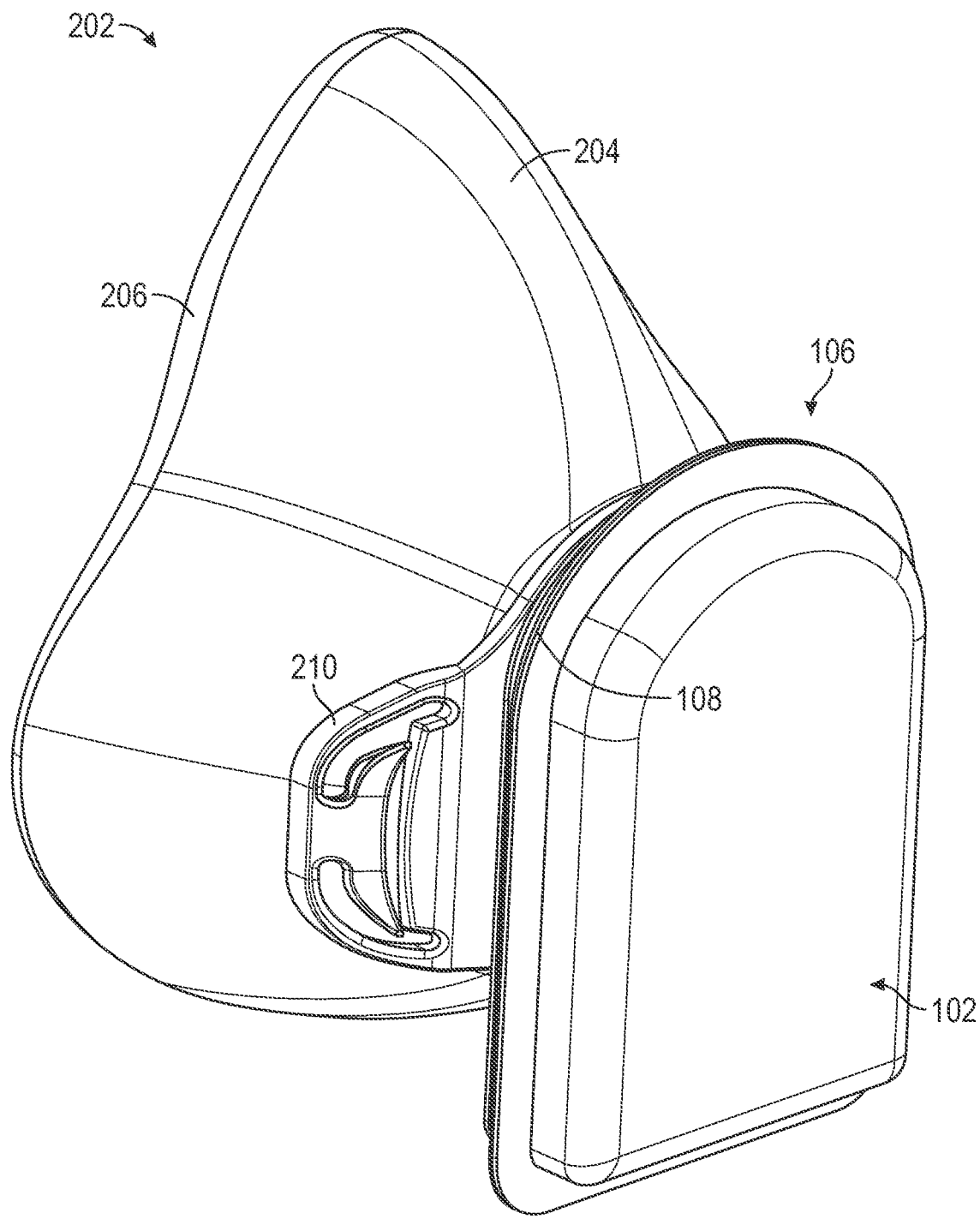
FIG. 2 shows an example filter fitted to a respirator, according to an example embodiment.
Figure 3:
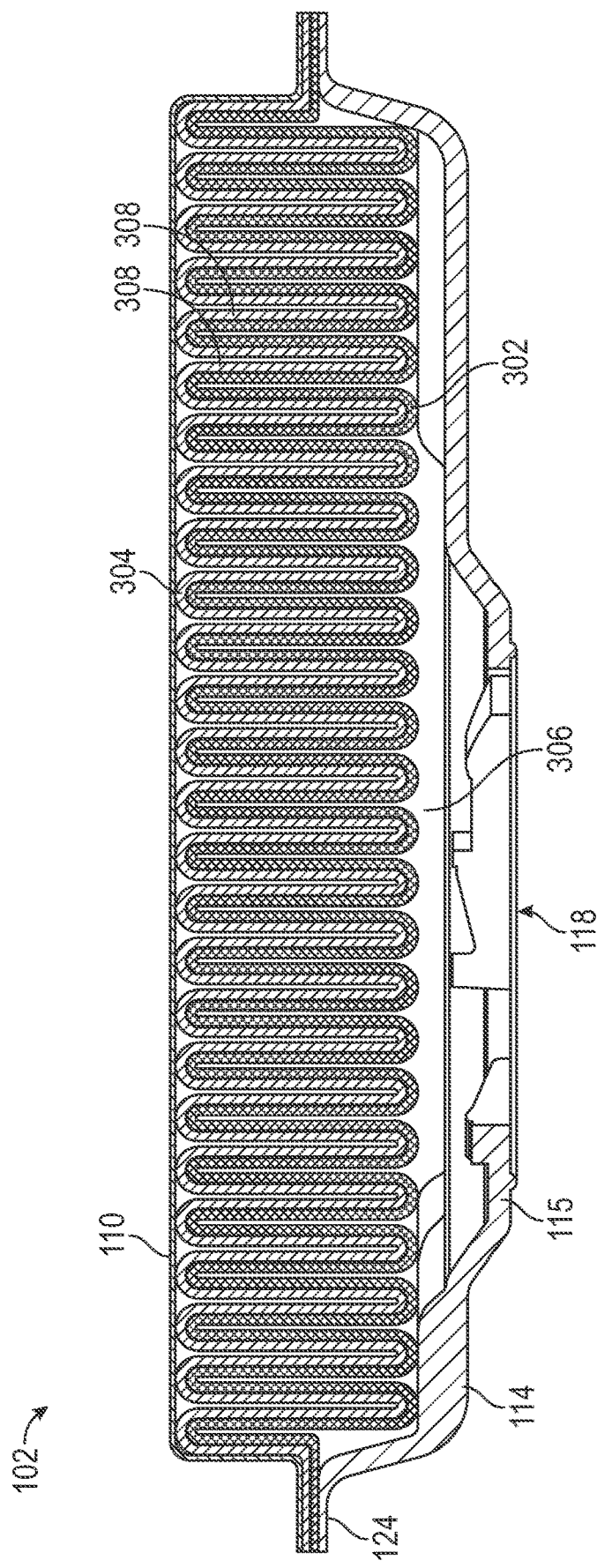
FIG. 3 shows a cross sectional view of the filter 102 taken at the line 3-3 of FIG. 1F.

FIG. 3 shows a cross sectional view of the filter 102 taken at the line 3-3 of FIG. 1F and shows internal pleated folds 308. The cross sectional view of the filter 102 includes the cover 110, the preformed filter mounting element 114, and the raised bayonet 115. The rim 124 and the mounting aperture 118 in the raised bayonet 115 are also shown in cross section. The view illustrates a first example of the pleated folds 308 of the present disclosure, although alternate constructions are possible. As shown in FIG. 3, the pleated folds 308 are oriented horizontally relative to the face of the user of a face piece or respirator (e.g., the respirator 202, FIG. 2) to which the filter 102 is fitted. Other orientations of the pleated folds are possible.

A pleated openwork flexible plastic layer 302 and pleated filter material 304 are arranged in parallel pleated folds 308 in the manner illustrated in FIG. 3 in the fashion of an accordion in such a way that the pleated openwork flexible plastic layer 302 and the pleated filter material 304 are adjacent each other in neighboring pleated folds 308. In one aspect, the pleated openwork flexible plastic layer 302 acts as a spacer, which keeps the neighboring and parallel portions of the pleated filter material 304 apart (i.e., at a distance that permits the unhindered entry of air onto the whole surface of the pleated filter material 304). In another aspect, the pleated openwork flexible plastic layer 302 within every pleated fold 308 prevents the pleated filter material 304 from terminating in the apex of a pleated fold 308 in a sharp bend. The pleated folds 308 are thus smoothly rounded and loose so that mechanical damage to the pleated filter material 304 is largely prevented.

The pleated folds 308 in the illustrated construction include two layers of material, although it will be appreciated from a review of FIG. 4 (described further below) that further layers of the pleated folds and the cover 110 are possible. Specifically, in FIG. 3, the pleated folds 308 generally include a plastic netting such as a pleated openwork flexible plastic layer 302 that supports a filter media such as a layer of pleated filter material 304. The pleated openwork flexible plastic layer may include netting material having a plurality of perforations allowing free passage of air through the perforations of the plastic netting material.

Figure 4:
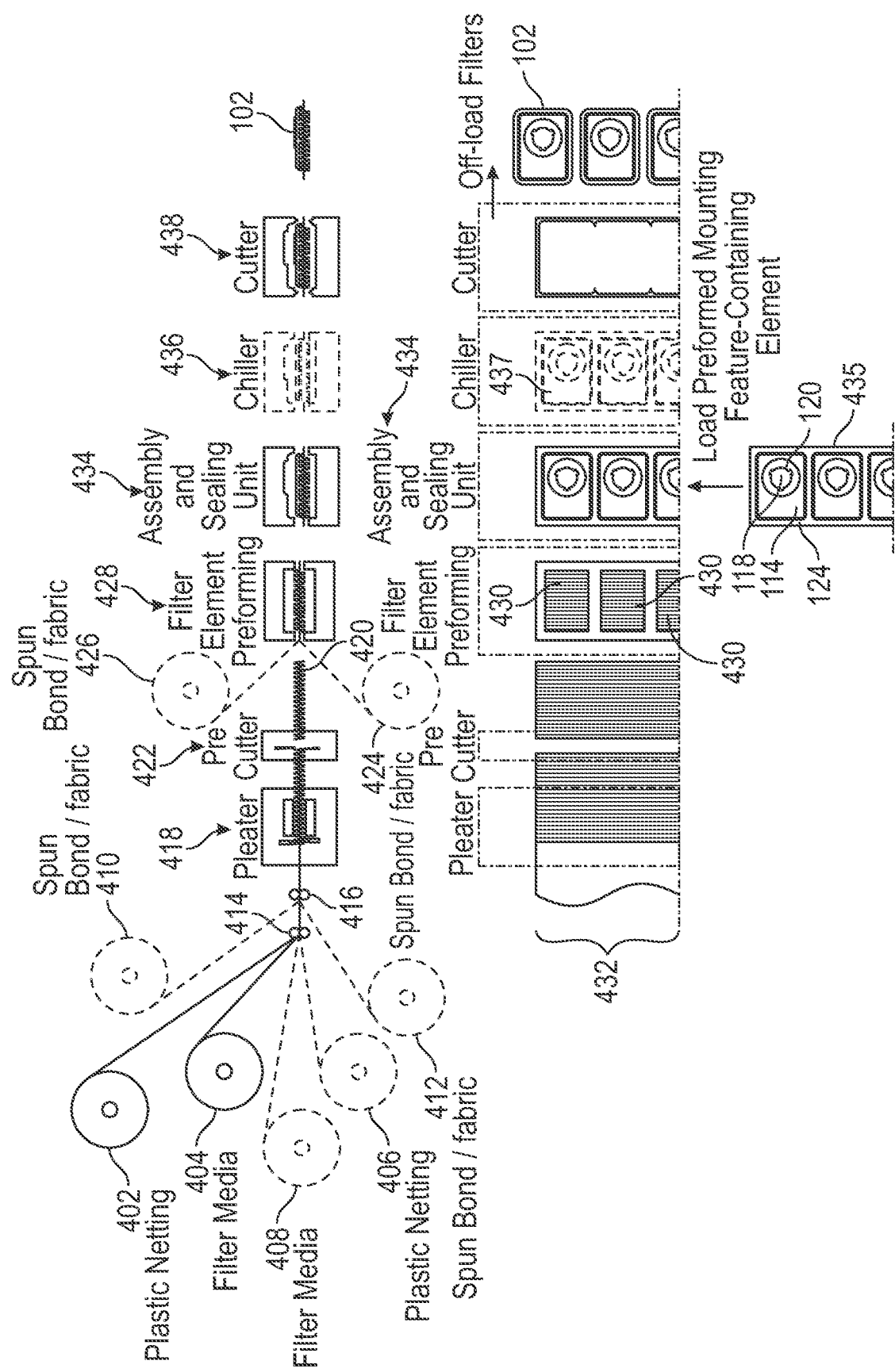
FIG. 4 shows aspects of a method of making a filter, according to an example embodiment.

In some examples, the pleated filter material 304 may be sandwiched by two pleated openwork flexible plastic layers 302 (for example, by plastic netting material coming off the roller 402 and 406, as shown in FIG. 4). The sandwiched layers and/or pleated folds 308 may additionally, in some examples, be covered in a pre-pleating operation by one or more layers of a spun bond or fabric layer (for example as shown by the rollers 410 and 412 of spun bond or fabric rollers in FIG. 4). Further, a layer of soft fabric for the cover 110 may be applied after pleating of the folds as shown in FIG. 4 and may provide for additional comfort and "feel" for a user of the filter 102.

The one or more pleated openwork flexible plastic layers 302 provide support layers to carry the pleated filter material 304. In particular, the pleated openwork flexible plastic layer 302 may be formed from sheets that have a plurality of openings to permit the free passage of air. The pleated openwork flexible plastic layer 302 may be formed from a perforated plastic material, a woven plastic material, a mesh plastic material, and so forth. In general, the woven or mesh plastic material is of the type that can be molded to a desired contour configuration and will retain that configuration so as to support the filter media, yet at the same time be flexible enough to allow for opening and closing movement of the pleats as needed.

More specifically, the pleated openwork flexible plastic layer 302 may be composed of various types or combinations of plastic materials such as vinyls and/or polyethylenes which allow for moldability to form the desired configuration yet with flexibility to allow for movement of the pleated folds 308. In some examples, the pleated openwork flexible plastic layer 302 may be formed from a plastic sheet that has a pattern of openings or may be formed from a sheet of woven material or may be formed from a sheet of mesh material. In particular, the pleated openwork flexible plastic layer 302 may be formed from various plastic materials such as vinyl, polyethylene, or other materials or combinations of materials. As an example, the pleated openwork flexible plastic layer 302 has been formed from ethyl vinyl acetate polypropylene blend.

One advantage of a pleated filter versus a flat filter is the ability to provide a larger filtration surface area (higher filtration efficiency with lower breathing resistance) in relatively compact dimensions. The filtration surface area of a pleated filter can be controlled by changing pleat height and density based on the level of filtration requirements. In other aspects relating to breathability, the openings in the pleated openwork flexible plastic layer(s) 302 facilitate the flow of inhaled air and thus contribute to ease of breathability. Ease of breathability is an important aspect of filter design, and may, in some examples, be balanced against a need to provide high levels of filtration, which may serve to inhibit the flow or air and act against ease of breathability.

To this end, in some examples, the filter 102 includes a plenum or "free volume" 306 located immediately adjacent the mounting aperture 118. The plenum 306 is devoid of the pleated folds 308 and any other material and defines a wide passage or capacitive volume allowing the collection and passage of smooth, unrestricted air into the respirator 202 after the air has passed through the pleated filter material 304 before passing through the bayonet 115 into the respirator 202. Additionally, and unlike a circular filter, the extra surface area provided by the pleated folds 308 can extend further into the square corners of the substantially rectangular filter 102. This has the additional benefit of improving filter performance by increasing surface area which has a direct relationship with ease of breathing.

The filter media is provided for filtering impurities in air passing through the filter. The pleated filter material 304 may be formed from filter polymeric materials such as non-woven polyester fiber material, or electrostatically charged polypropylene and may contain an amount of activated carbon for the purpose of filtering various organic vapors at an amount that would not inhibit the formation of the bonded air impermeable sealed edge of the filter. Some of these different types of filter material cannot withstand high heat since the high heat could damage the filtering properties of the material. In some examples, for example with reference to FIG. 4 below, a chiller is used to protect the pleated filter material 304 and gently harden any soft or melted materials during filter formation.

The filter structure of FIG. 3 contemplates the use of pleated filter material 304 which will at least to some degree be held in place with the one layer of pleated openwork flexible plastic layer 302 even though the pleated filter material 304 is not sandwiched between two layers of such plastic material. The relative positions of the layers of pleated openwork flexible plastic layer 302 and pleated filter material 304 may be reversed. The pleated filter material 304 may be relatively thick and yet still be properly supported by the carrier layers of pleated openwork flexible plastic layers 302. In addition, the pleated filter material 304 may not be shape retaining or self-supporting, so it may be necessary to use further carrier means to provide for the support of the pleated filter material.

In some examples, the pleated folds 308 construction comprises at least one layer of melt blown polypropylene filter media covered by at least one layer of resilient plastic netting. A resilient polymer material containing at least about 15% EVA may be beneficial, with a basis weight of about 20 grams/sq. meter or higher, depending on the weight of the desired filter media. When a high level of filtration is required, some examples include a filter media of a higher basis weight, either by using heavier melt blown filter media or by using multiple layers of lighter weight filter media. In some examples, a higher weight filter media requires a higher weight plastic netting and vice versa to provide the necessary balance of flexibility and resilience.

In some examples, the cover 110, which may contact the skin when the filter is handled, is covered by, or includes, a spun bond non-woven material that is traditionally non-elastic in its stretch properties. However, when pleated in concert with the rest of the materials (see FIG. 4 for example), the spun bond material retains the resilience and spring-like quality of the underlying filter media.

In some examples, for example as shown in FIG. 4 described further below, the pleated folds 308 of pleated openwork flexible plastic layer 302 and pleated filter material 304 are surrounded by an envelope of spun bond or fabric material. In some examples, all the components of the filter 102 are held together by a form-defining rim 124 in which the opposed pieces of the envelope, the cover 110, the pleated openwork flexible plastic layer 302, and an edge region of the filter mounting element 114 (such as the rim 124) are firmly interconnected over the whole circumference of the filter 102.

In the illustrated examples, the rim 124 extends around the whole circumference of the filter 102 and is designed as a sealing rim of sufficient width, strength, and stiffness, so that a filter 102 can be fitted as a one-piece self-supporting unit to a respirator, for example as shown in FIG. 2. In some examples, the rim 124 is of a uniform thickness. In some examples, the rim 124 of the filter mounting element 114 is bonded simultaneously with other layers of the filter 102 in a thermopressing operation in which the application of high pressure and temperatures ensures that the rim 124 has a uniform thickness all around the filter 102 in a direction transverse to or along the pleated folds despite different amounts of internal material. At the same time, the distance between the pleated folds may be held constant owing to the relative stability of the pleated openwork flexible plastic layer 302 which supports continued efficient performance of the pleated filter material 304.

With reference now to FIG. 4, during manufacture of the filter 102, webs of the cover 110 and selected layers of the pleated folds 308, including the filter material (such as the pleated filter material 304) and the plastic netting (such as the pleated openwork flexible plastic layer 302) are superimposed in a desired sequence.

In FIG. 4, the plastic netting material for the pleated openwork flexible plastic layer 302 of the filter 102 of FIG. 3 is supplied by a plastic netting roller 402. The filter media for the layer of pleated filter material 304 is supplied by a filter media roller 404. Additional layers of plastic netting, for example for the sandwiching layers discussed above, of pleated openwork flexible plastic layer 302 are supplied by a plastic netting roller 406. Additional layers of filter media (for higher levels of filtration, for example) are provided by a filter media roller 408. Material for an envelope around pre-pleated layers of pleated openwork flexible plastic layer 302 and pre-pleated filter material 304 is supplied from a spun bond/fabric roller 410 and a spun bond/fabric roller 412. The superimposed desired materials are guided through guide rollers 414 and guide rollers 416 into a pleater 418.

The pleater 418 pleats the superimposed layers, i.e., at least the pleated openwork flexible plastic layer 302 and the pleated filter material 304 (and any additional layers from the rollers described above), into parallel pleated folds 308 as shown in FIG. 3. In some examples, the pleated folds 308 have a selected height and density. Levels of filtration and ease of breathability can be configured and/or balanced using factors such a fold height, length, and density, in conjunction with selection of aspects such as the material properties and pore sizes of the filter media and plastic netting, for example. Other aspects are possible. In some examples, the size (width) of the webs of the superimposed materials is expediently chosen such that the width in the finish-folded state of the pleated folds 308 in a direction transverse to the pleated folds 308 corresponds approximately to a width or length of the filter 102.

The pleated folds 308 of superimposed layers are then advanced during the process of FIG. 4 to a pre-cutter 422 that cuts the pleated folds 308 into separate lengths 420 of pleated folds 308. In some examples, after cutting into separate lengths, one of more layers of spun bond or fabric material constituting the cover 110 (see FIG. 3) of the filter 102 is supplied by a cover material supply roller 424. In the orientation of the pleated folds shown in FIG. 4, the material forming the cover 110 is provided on a lower surface of the separate lengths 420 of pleated folds (i.e., on the lower surface thereof, facing down).

In some examples, an envelope material enclosing an upper surface (or reverse side) of the separate lengths 420 of pleated folds is also provided. For this purpose, spun bond or fabric material for an envelope layer is supplied by an envelope material supply roller 426. The envelope layer is located against the pleated folds on the opposite side thereof and, together with the material of the cover 110, forms an envelope or pocket for each separate length 420 of pleated folds.

A series of partially covered or fully enveloped separate lengths 420 of pleated folds advances to a filter element pre-former 428 where peripheral edges of the separate lengths of pleated folds and the cover 110 and/or envelope are sealed together to form a series of interconnected pre-formed pleated filter elements 430. In some examples, at this stage, the preformed pleated filter elements 430 remain contiguous or at least laterally joined to each other by webs of material from which they are formed, as shown. The cover 110 and envelope materials support the pleated folds in a direction transverse to the folds (i.e., in the process direction) so that the pleated folds in each separate length do not burst open as they are guided in pleated form to the filter element pre-former 428.

In some examples, for example as illustrated in FIG. 4, a width 432 of the webs of material forming at least the pleated folds (i.e., the pleated openwork flexible plastic layer 302 and the pleated filter material 304) is selected so that a series of adjacent pleated filter elements 430, as arranged, for example, side by side (contiguous, or spaced apart as shown), can be simultaneously formed in a single filter element forming operation. Similarly, the width of the webs of any further layers included in a pleated filter element 430, such as filter media, plastic netting, cover material, spun bond or fabric material supplied by any one or more of the supply rollers such as the plastic netting roller 406, the filter media roller 408, the spun bond/fabric roller 410, the spun bond/fabric roller 412, the cover material supply roller 424, and/or the envelope material supply roller 426 is selected so that a series of adjacent preformed filter elements, as shown by the plurality of adjacent pleated preformed filter elements 430 in FIG. 4, can be simultaneously formed in a single filter element forming operation.

The preformed pleated filter elements 430 are subsequently guided to an assembly and sealing unit 434. The assembly and sealing unit 434 includes a thermoforming tool. In some examples, the assembly and sealing unit 434 comprises a first thermoforming member having a mold configuration conforming generally to the contours of the preformed filter mounting element 114 of the filter 102, and a second opposed thermoforming member that may generally conform to the contours of the opposite side of the filter 102.

At the assembly and sealing unit 434, a layer of semi-rigid plastic material 435 having preformed shells embodying the shape and configuration of a least one (here a plurality) of preformed filter mounting elements 114 is provided, as shown. Each preformed filter mounting element 114 includes a preformed bayonet 115, a preformed mounting aperture 118, preformed mounting formations 120, and a preformed rim 124. The preformed and uncut layer of plastic material 435 is moved laterally to the process flow in the view so that each preformed filter mounting element 114 in the plastic layer 435 encapsulates, or at least accepts, a respective preformed pleated filter element 430 to form a series 437 of interconnected filters 102, as shown.

The filter 102 manufacturing method of FIG. 4 includes moving the interconnected preformed pleated filter elements 430 and the layer of plastic material 435 (embodying or including the interconnected filter mounting elements 114) between the first thermoforming member and the second thermoforming member, and heating and pressing the first thermoforming member and the second thermoforming member together to join peripheral edges of the preformed pleated filter elements 430 and rims 124 of the filter mounting elements 114 together.

In some examples, the assembly and sealing unit 434 successively loads one by one, or in batch mode, a preformed filter mounting element 114 to a preformed pleated filter element 430. In some examples, other methods of preforming the filter mounting element 114 are possible, such as injection molding, compression molding, vacuum forming, or other techniques known to person skilled in the art.

In an example thermoforming process of the assembly and sealing unit 434, a preformed pleated filter element 430 (comprising multiple layers of filter media and plastic materials, e.g., the pleated openwork flexible plastic layer 302 and the pleated filter material 304), and a preformed filter mounting element 114 are optionally formed, and/or molded, and/or bonded (sealed) jointly together in a single thermoforming operation.

In some examples, the compatible, meltable plastic materials of the preformed pleated filter element 430 and the preformed filter mounting element 114 are melted together in the thermoforming tool in the area of the rim 124 at least to such an extent that upon the appropriate application of pressure and energy, such as heat, the plastic layers and the superimposed materials are collectively and simultaneously melted and pressed into sealing contact with each other to form an air impermeable sealing rim defining and extending around the outline or periphery of a filter 102. A compact sealing of uniform thickness and width over the whole periphery of the filter 102 is created and then cooled and stiffened by a chiller 436. In some examples, melting energy for the plastic materials of the preformed pleated filter element 430 and the preformed filter mounting element 114 is supplied by heat. In some examples, melting energy is supplied by the application of RF power and/or ultrasonic vibrations. A combination of melting energies and/or pressure may be applied in forming the air impermeable sealing rim of the filter 102.

Figure 5A:
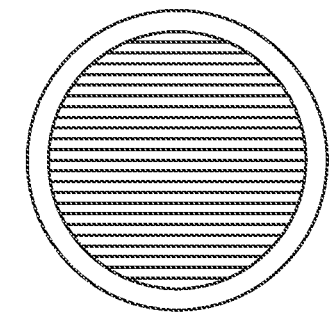
Figure 5A:
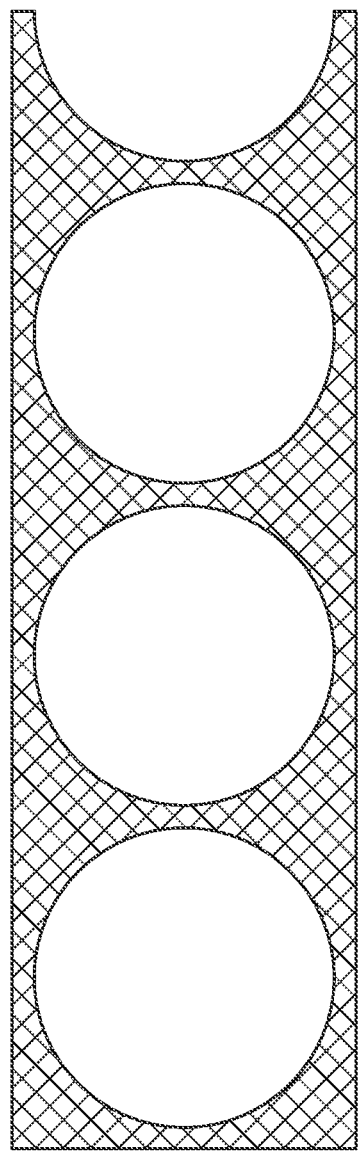

In the method of FIG. 4, the chilled interconnected filters 102 are subsequently punched out or cut by a cutter 438. With reference to FIG. 5B, in some examples, the cutter 438 punches out multiple filters 102 in a single-stroke cutting operation along common cutting lines 502 located between adjacent filters 102. As compared to the circular prior art examples shown in FIG. 5A, the rectangular shape of the present example filters 102 enables the use of common cutting lines 502 and consequent manufacturing efficiency. A batch or plurality of filters 102 may be punched or cut out at one time. Further, the use of common cutting lines 502 enables, by dint of the commonality, a high degree of precision, repeatability, and consistency in forming substantially rectangular filter shapes. These and other advantages are possible.

Some example filters 102 include, for filter media, at least one layer of electrostatically charged melt blown filter layer made from PP. In some examples, the cover 110 of the filter 102 is plastic and made using various plastic resins (preferably PP, PE, or a combination of both). In some examples, the thermoforming and molding process at the assembly and sealing unit 434 is controlled by temperature, pressure, and time based on plastic resins, layers of materials, pleat height and pleat density. In some examples, a height of the pleated folds 308 is in a range of 6 mm to 30 mm and, in some examples, in a range of 8 mm to 20 mm. Based on the nature or material properties of the abovementioned plastic materials used to manufacture a filter 102, and/or a thickness of the layers of the filter 102, a flattening and/or sealing surface area temperature in the thermoforming process is in a temperature range of 120 C to 180 C, and/or a pressure range of 0.5 T to 3 T, and/or a thermoforming (or sealing) time in a range of 5 to 45 seconds.

Figure 6:
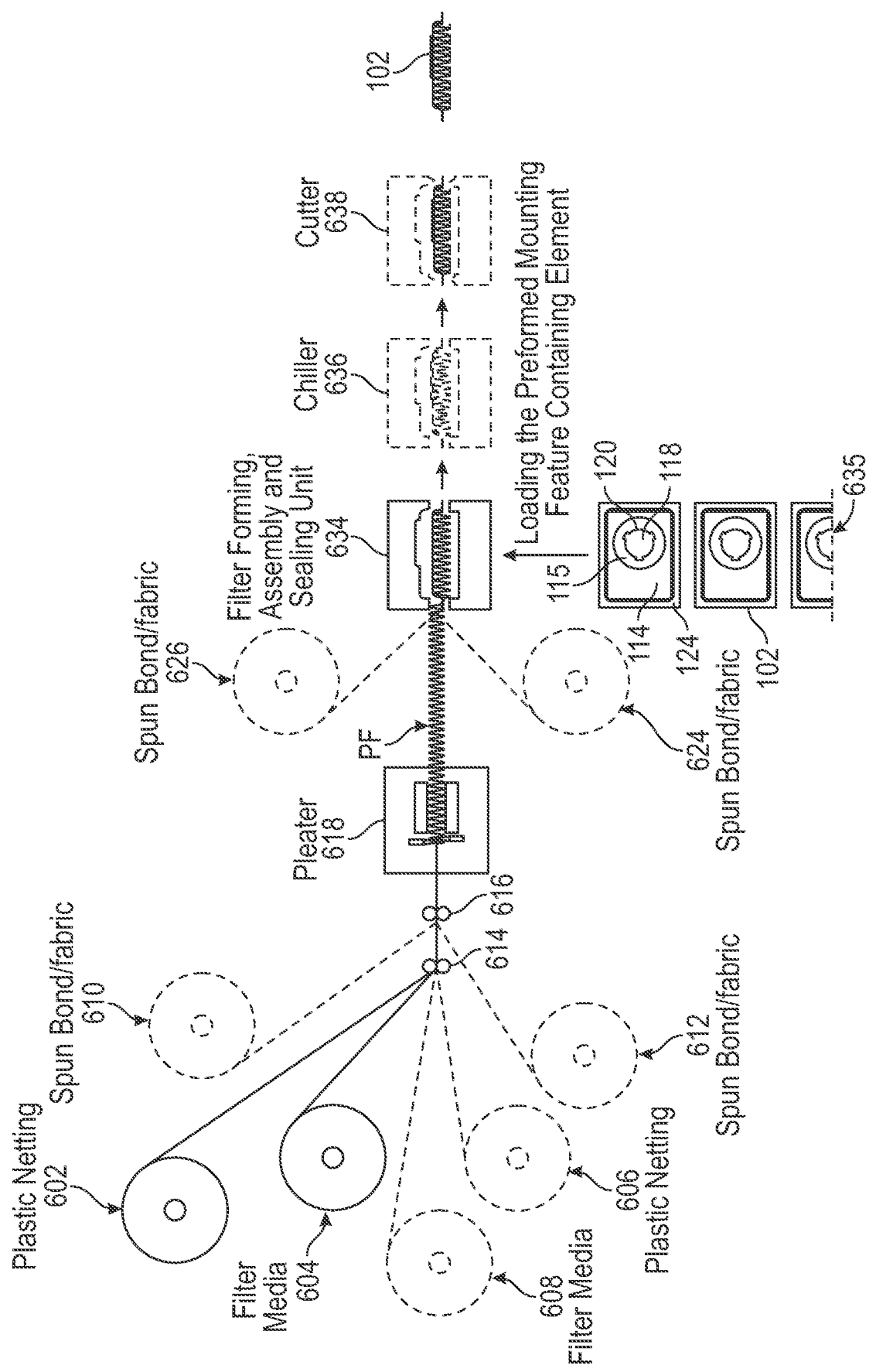
FIG. 6 shows aspects of another method of making a filter, according to an example embodiment.

FIG. 6 illustrates example operations in another method of making a filter 102. Some of the operations of FIG. 4 may be used interchangeably with or inserted into or removed from the operations of FIG. 6, and vice versa. In some respects, the method of FIG. 6 may be considered shorter and more compact than the method of FIG. 4, and may further combine multiple operations into a reduced or single operation. Alternate combinations of operations are possible. For example, the method of FIG. 6 avoids use of a pre-cutter 422 and the "preforming" of filter elements 430 by the filter element pre-former 428.

Similarly, in the more compact method of FIG. 6, webs of the cover 110 and selected layers to create pleated folds (shown at PF), including the filter material (such as the pleated filter material 304) and plastic netting (such as pleated openwork flexible plastic layer 302) are superimposed in a desired sequence.

In FIG. 6, the plastic netting material for the pleated openwork flexible plastic layer 302 of the filter 102 of FIG. 3 is supplied by a plastic netting roller 602. The filter media for the layer of pleated filter material 304 is supplied by a filter media roller 604. Additional layers of plastic netting, for example for the sandwiching layers discussed above, of pleated openwork flexible plastic layer 302 are supplied by a plastic netting roller 606. Additional layers of filter media (for higher levels of filtration, for example) are provided by a filter media roller 608. Material for an envelope around the pre-pleated layers of pleated openwork flexible plastic layer 302 and pleated filter material 304 is supplied from a spun bond/fabric roller 610 and a spun bond/fabric roller 612. The superimposed materials are guided through guide rollers 614 and guide rollers 616 into a pleater 618.

The pleater 618 pleats the superimposed layers, i.e., at least the pleated openwork flexible plastic layer 302 and the pleated filter material 304 (and any additional layers from the rollers described above) into parallel pleated folds PF as shown in FIG. 6. In some examples, the pleated folds PF have a selected height and density. As discussed above, levels of filtration and ease of breathability can be configured and/or balanced using factors such a fold height, length, and density, in conjunction with selection of aspects such as the material properties and pore sizes of the filter media and plastic netting, for example. Other aspects are possible. In some examples, the size (width) of the webs of the superimposed materials is expediently chosen such that the width in the finish-folded state of the pleated folds in a direction transverse to the folds corresponds approximately to a width or length of the filter 102.

The pleated folds PF of superimposed layers are then advanced directly in the process of FIG. 6 to a filter forming, assembly and sealing unit 634. In some examples, immediately prior to entering the filter forming, assembly and sealing unit 634, one of more layers of spun bond or fabric material constituting the cover 110 of the filter 102 is supplied by a cover material supply roller 624. In the orientation of the pleated folds shown in FIG. 6, the material forming the cover 110 is provided on a lower surface of the pleated folds (i.e., facing down). In some examples, an envelope material enclosing an upper surface (or reverse side) of the pleated folds is also provided. For this purpose, spun bond or fabric material for an envelope layer is supplied by an envelope material supply roller 626. The envelope layer is located on the opposite side of the pleated folds and, with the material of the cover 110, forms an envelope or pocket for the pleated folds.

The filter forming, assembly and sealing unit 634 includes a thermoforming tool. In some examples, the filter forming, assembly and sealing unit 634 comprises a first thermoforming member having a mold configuration conforming generally to the contours of the preformed filter mounting element 114 of the filter 102, and a second opposed thermoforming member that may generally conform to the contours of the opposite side of the filter 102.

At the filter forming, assembly and sealing unit 634, a series 635 of discrete preformed shells or layers of semi-rigid plastic material each embodying the shape and configuration of a filter mounting element 114 is provided and moved laterally to the process flow each to encapsulate, or at least accept, a respective region or section of the web of pleated folds PF to form, when pushed together by the first and second thermoforming members, a continuous web of interconnected filters 102 moving in the process direction, as shown. Each preformed filter mounting element 114 includes a preformed bayonet 115, a preformed mounting aperture 118, preformed mounting formations 120, and a preformed rim 124.

The filter 102 manufacturing method of FIG. 6 includes moving the pleated folds PF and the series 635 of discrete preformed filter mounting elements 114 in serial fashion between the first thermoforming member and the second thermoforming member, and heating and pressing the first thermoforming member and the second thermoforming member together to join peripheral edges of the pleated folds PF and the rims 124 of the filter mounting elements 114 together. In some examples, the filter forming, assembly and sealing unit 634 loads a preformed filter mounting element 114 onto a region of the pleated folds PF. In an example thermoforming process of the tool, a region of the pleated folds PF (comprising multiple layers of filter media and plastic materials, e.g., the pleated openwork flexible plastic layer 302 and the pleated filter material 304) underlying a laterally advanced discrete preformed filter mounting element 114 is bonded (sealed) jointly to the overlying preformed filter mounting element 114 in a single thermoforming operation.

In some variations of FIG. 6, the series 635 of preformed filter mounting elements 114 is provided in a continuous layer of plastic material similar, for example, to the continuous layer of plastic material 435 of FIG. 4. Here, the preformed filter mounting elements 114 remain interconnected while accepting respective regions of the pleated folds PF and are later cut into discrete filters 102 by the cutter 638. In some other variations of FIG. 6, each discrete preformed filter mounting element 114 in the series 635 is precut before encapsulating or accepting a region of the pleated folds PF. The discrete preformed filter mounting elements 114 in the series 635 may be precut from a continuous layer of preformed plastic material, for example a preformed layer of semi-rigid plastic material 435 embodying the shape and configuration of a series of interconnected preformed filter mounting elements 114 of the type of FIG. 4.

During thermoforming, the plastic materials of the region of the pleated folds PF and the preformed filter mounting elements 114 are softened in the thermoforming tool of the filter forming, assembly and sealing unit in the area of the rim 124, at least to such an extent that upon the appropriate application of pressure and heat, the plastic layers and the superimposed materials are collectively and simultaneously pressed into sealing contact with each other to form a sealing rim defining the outline of a filter 102.

In some examples, the compatible, meltable plastic materials of the pleated folds PF and the preformed filter mounting element 114 are melted together in the thermoforming tool in the area of the rim 124 at least to such an extent that upon the appropriate application of pressure and energy, such as heat, the plastic layers and the superimposed materials are collectively and simultaneously melted and pressed into sealing contact with each other to form an air impermeable sealing rim defining and extending around the outline or periphery of a filter 102. A compact sealing of uniform thickness and width over the whole periphery of the filter 102 is created. In some examples, melting energy for the plastic materials of the preformed pleated filter element 430 and the preformed filter mounting element 114 is supplied by heat. In some examples, melting energy is supplied by the application of RF power and/or ultrasonic vibrations. A combination of melting energies and/or pressure may be applied in forming the air impermeable sealing rim of the filter 102.

A compact sealing of uniform thickness and width over the whole circumference of the filter 102 is created and then cooled and stiffened by a chiller 636. In some examples, the chilled filters 102 are subsequently punched out or trimmed by a cutter 638.

In some examples of the method of FIG. 6, a width of the web of pleated folds PF (i.e., the pleated openwork flexible plastic layer 302 and the pleated filter material 304 delivered by the rollers 602 and 604) matches a width or other lateral dimension of the preformed filter mounting elements 114 in the series 635 so that a series of discrete or interconnected filters 102 can be formed without the need to cut off edge regions of the pleated folds PF. As noted above, in some examples of FIG. 6, the pleated folds PF are not cut into separate lengths. The avoidance of cutting lateral edges of the pleated folds PF and/or cutting them into separate lengths (i.e., the avoidance of cutting in any manner) before being formed into a filter 102 by the filter forming, assembly and sealing unit 634 may help to preserve the integrity of the pleated folds PF and/or fold spacing and height during manufacture of the filters 102.

Similarly, the width of the webs of any further layers included in the pleated folds, such as filter media, plastic netting, cover material, spun bond or fabric material supplied by any one or more of the supply rollers such as the plastic netting roller 606, the filter media roller 608, the spun bond/fabric roller 610, the spun bond/fabric roller 612, the cover material supply roller 624, and/or the envelope material supply roller 626 is selected so that discrete filters 102 can be formed without the need to cut off edge regions of these webs of material, or to cut them into separate lengths.

Some example filters 102 made by the methods of FIG. 4 or FIG. 6 include at least one layer of plastic mesh or netting made from a thermoplastic resin including, for example, polyethylene (PE), polypropylene (PP), ethylene vinyl acetate (EVA) (an elastomeric polymer that produces materials that are "rubber-like" in softness and flexibility), or a combination of two or three of such plastic materials and additives.

Some examples made by the methods of FIG. 4 or FIG. 6 include, for filter media, at least one layer of electrostatically charged melt blown filter layer made from PP. Some examples include at least one layer of pre-formed plastic material for the bayonet 114 to attach the filter 102 to a face mask or respirator with no need for additional parts such as a filter holder, cover, or other components. In some examples, the cover 110 of the filter 102 is plastic and made using various plastic resins (preferably PP, PE, or a combination of both). In some examples, the thermoforming and molding process is controlled by temperature, pressure, and time based on plastic resins, layers of materials, pleat height and pleat density. In some examples, a height of the folded pleats is in a range of 6 mm to 30 mm and, in some examples, in a range of 8 mm to 20 mm. Based on the nature or material properties of the abovementioned plastic materials used to manufacture a filter 102, and/or a thickness of the layers of the filter 102, a flattening and/or sealing surface area temperature in the thermoforming process is in a temperature range of 120 C to 180 C, and/or a pressure range of 0.5 T to 3 T, and/or a thermoforming (or sealing) time in a range of 5 to 45 seconds.

Thus, in one aspect, a method of making a filter for direct mounting to a face piece or respirator is provided. An example method comprises providing a layer of flexible plastic netting material having a plurality of perforations allowing free passage of air through the perforations of the flexible plastic netting material; providing a layer of polymeric filter media for filtering impurities in air passing through the filter; positioning the layer of flexible plastic netting material and the layer of polymeric filter media to lie one on top of the other to form a multilayer of flexible plastic netting material and polymeric filter media; moving the multilayer of flexible plastic netting material and polymeric filter media to a pleater; pleating the multilayer of flexible plastic netting material and polymeric filter media to form a pleated composite layer of flexible plastic netting material and polymeric filter media having an overall structure of continuous and adjacent pleated folds; moving a length of the pleated composite layer to a filter forming, assembly and sealing unit; at the filter forming, assembly and sealing unit, combining the length of the pleated composite layer with a preformed filter mounting element, the preformed filter mounting element comprising a feature for connecting the filter to the face piece or respirator, and a plenum devoid of the pleated composite layer, the plenum defining a free volume allowing passage of unrestricted inhaled air into the face piece or respirator after the inhaled air has passed through the polymeric filter media of a connected filter, the filter forming, assembly and sealing unit having a thermoforming tool including a mold configuration conforming generally to contours of the preformed filter mounting element; and by the filter forming, assembly and sealing unit, melting and pressing together plastic material of the pleated composite layer and plastic material of the pleated composite layer and the preformed filter mounting element thereby to join and bond together, by the melting of the plastic material of the pleated composite layer and the plastic material of the preformed filter mounting element, a region of the pleated composite layer and a rim of the preformed filter mounting element to form an air impermeable seal extending around a periphery of the filter.

In some examples, the filter is a substantially rectangular filter.

In some examples, the layer of polymeric filter media is made of or includes polypropylene.

In some examples, the layer of polymeric filter media includes carbon particles embedded therein.

In some examples, the layer of polymeric filter media includes an electrostatically charged melt blown filter layer.

In some examples, the method further comprises applying a first cover to a first side of the pleated composite layer.

In some examples, the method further comprises providing a second cover to a second side of the pleated composite layer.

In some examples, the preformed filter mounting element is provided as a discrete or precut filter mounting element.

In some examples, the preformed filter mounting element is provided as an interconnected filter mounting element embodied in a continuous plastic layer including an interconnected series of preformed filter mounting elements.

In some examples, the preformed filter mounting element includes a preformed plastic material shaped to define a bayonet of the filter, the bayonet enabling direct mounting of the filter to a face piece or respirator.

In some examples, the bayonet includes a mounting aperture surrounded by one or more locking formations for direct mounting of the filter to the face piece or respirator without intervention of a filter cartridge or filter capsule.

In some examples, the plenum is located immediately adjacent the mounting aperture.

In some examples, the method further comprises applying heat and pressure to join and seal together regions of the combined pleated composite layer and preformed filter mounting element to form a series of interconnected filters.

In some examples, the method further comprises chilling the series of interconnected filters.

In some examples, the method further comprises cutting the series of interconnected filters into separate filters.

In some examples, the method further comprising cutting the series of interconnected filters into separate filters along at least one common cutting line.

In some examples, the length of the pleated composite layer is a separated length of the pleated composite layer.

In another aspect, a method of making a filter for direct mounting to a face piece or respirator comprises providing a layer of flexible plastic netting material having a plurality of perforations allowing free passage of air through the perforations of the plastic netting material; providing a layer of polymeric filter media for filtering impurities in air passing through the filter; positioning the layer of flexible plastic netting material and the layer of polymeric filter media to lie one on top of the other to form a multilayer of flexible plastic netting material and polymeric filter media; moving the multilayer of flexible plastic netting material and polymeric filter media to a pleater; pleating the multilayer of flexible plastic netting material and polymeric filter media to form a pleated composite layer of flexible plastic netting material and polymeric filter media having an overall structure of continuous and adjacent pleated folds; moving a length of the pleated composite layer to a filter element pre-former; by the filter element pre-former, compressing peripheral edges of the length of the pleated composite layer to form a preformed pleated filter element; moving the preformed pleated filter element to an assembly and sealing unit and combining the preformed pleated filter element with a preformed filter mounting element, the preformed filter mounting element including a feature to connect the filter directly with the face piece or respirator, and a plenum devoid of the pleated composite layer, the plenum defining a free volume allowing passage of unrestricted inhaled air into the face piece or respirator after the inhaled air has passed through the polymeric filter media of a connected filter, the assembly and sealing unit having a mold configuration conforming generally to contours of the preformed filter mounting element; and by the assembly and sealing unit, melting and pressing together plastic material of the preformed pleated filter element and plastic material of the preformed filter mounting element thereby to join and bond together, by the melting of the plastic material of the preformed pleated filter element and plastic material of the preformed filter mounting element, a region of the preformed pleated filter element and a rim of the preformed filter mounting element to form an air impermeable seal extending around a periphery of the filter.

In some examples, the length of the pleated composite layer is a separated length of the pleated composite layer.

In some examples, the filter is a substantially rectangular filter.

In some examples, the layer of polymeric filter media is made of or includes polypropylene.

In some examples, the layer of polymeric filter media includes carbon particles embedded therein.

In some examples, the layer of polymeric filter media includes an electrostatically charged melt blown filter layer.

In some examples, the method further comprises applying a first cover to a first side of the pleated composite layer.

In some examples, the method further comprises providing a second cover to a second side of the pleated composite layer.

In some examples, the preformed filter mounting element is provided as a discrete or precut filter mounting element.

In some examples, the preformed filter mounting element is provided as an interconnected filter mounting element embodied in a continuous plastic layer including an interconnected series of preformed filter mounting elements.

In some examples, the preformed filter mounting element includes a preformed plastic material shaped to define a bayonet of the filter, the bayonet enabling direct mounting of the filter to a face piece or respirator.

In some examples, the bayonet includes a mounting aperture surrounded by one or more locking formations for direct mounting of the filter to the face piece or respirator without intervention of a filter cartridge or filter capsule.

In some examples, the plenum is located immediately adjacent the mounting aperture.

In some examples, the method further comprises applying heat and pressure to join and seal together peripheral regions of the preformed filter element and preformed filter mounting element to form a series of interconnected filters.

In some examples, the method further comprises chilling the series of interconnected filters.

In some examples, the method further comprises cutting the series of interconnected filters into separate filters.

In some examples, the method further comprises cutting the series of interconnected filters into separate filters along at least one common cutting line.

Other technical features may be readily apparent to one skilled in the art from the following figures, descriptions, and claims. Although the present subject matter has been described with reference to particular embodiments, it is to be appreciated that various adaptations and modifications may be made.

What is claimed is:

1. A method of making a filter for a respirator, the method comprising:
   providing a layer of flexible plastic netting material having a plurality of perforations allowing free passage of air through the perforations of the flexible plastic netting material;
   providing a layer of polymeric filter media for filtering impurities in air passing through the filter;
   positioning the layer of flexible plastic netting material and the layer of polymeric filter media to lie one on top of the other to form a multilayer of flexible plastic netting material and polymeric filter media;
   moving the multilayer of flexible plastic netting material and polymeric filter media to a pleater;
   pleating the multilayer of flexible plastic netting material and polymeric filter media to form a pleated composite layer of flexible plastic netting material and polymeric filter media having an overall structure of continuous and adjacent pleated folds;
   moving a length of the pleated composite layer to a filter forming, assembly and sealing unit;
   at the filter forming, assembly and sealing unit, combining the length of the pleated composite layer with a preformed filter mounting element, the preformed filter mounting element molded from a plastic material, the preformed filter mounting element comprising:
   a rim flange;
   a filter mounting connector; and
   a plenum devoid of the pleated composite layer, the plenum defining a free volume between the filter mounting connector and the pleated composite layer allowing passage of unrestricted inhaled air through the filter mounting connector after the inhaled air has passed through the polymeric filter media of the filter;
   the filter forming, assembly and sealing unit having a thermoforming tool including a mold configuration conforming generally to contours of the preformed filter mounting element, the mold configuration having an upper mold and a lower mold; and by the upper mold and the lower mold:
melting and pressing together an edge region including plastic material of the pleated composite layer and plastic material of the rim flange of the preformed filter mounting element,
thereby to join and bond together, by the melting of the plastic material of the pleated composite layer and the plastic material of the rim flange, the edge region,
thereby forming an air impermeable seal extending around a periphery of the filter.

2. The method of claim 1, wherein the filter is a substantially rectangular filter.

3. The method of claim 1, wherein the layer of polymeric filter media is made of or includes polypropylene.

4. The method of claim 1, wherein the layer of polymeric filter media includes carbon particles embedded therein.

5. The method of claim 1, wherein the layer of polymeric filter media includes an electrostatically charged melt blown filter layer.

6. The method of claim 1, further comprising applying a first cover to a first side of the pleated composite layer.

7. The method of claim 6, further comprising providing a second cover to a second side of the pleated composite layer.

8. The method of claim 1, wherein the preformed filter mounting element is provided as a discrete or precut filter mounting element.

9. The method of claim 1, wherein the preformed filter mounting element is provided from a series of preformed filter mounting elements layer.

10. The method of claim 1, wherein the filter mounting connector includes a preformed plastic material shaped to define a bayonet of the filter, the bayonet enabling direct mounting of the filter to a face piece or the respirator.

11. The method of claim 10, wherein the bayonet includes a mounting aperture surrounded by one or more locking formations for direct mounting of the filter to the face piece or the respirator without intervention of a filter cartridge or filter capsule.

12. The method of claim 11, wherein the plenum is located immediately adjacent the mounting aperture.

13. The method of claim 1, further comprising applying heat and pressure to join and seal together regions of a combined pleated composite layer and a preformed filter mounting element for multiple filters being formed on a layer of semi-rigid plastic material, forming a series of interconnected filters, interconnected by the layer of semi-rigid plastic material.

14. The method of claim 13, further comprising chilling the series of interconnected filters.

15. The method of claim 14, further comprising cutting the series of interconnected filters into separate filters.

16. The method of claim 15, further comprising cutting the series of interconnected filters into separate filters along at least one common cutting line.

17. The method of claim 1, wherein the length of the pleated composite layer is a length separated from a longer length formed by the pleating of the multilayer of flexible plastic netting material and polymeric filter media.

18. A method of making a filter for a respirator, the method comprising:
providing a layer of flexible plastic netting material having a plurality of perforations allowing free passage of air through the perforations of the plastic netting material;
providing a layer of polymeric filter media for filtering impurities in air passing through the filter;
positioning the layer of flexible plastic netting material and the layer of polymeric filter media to lie one on top of the other to form a multilayer of flexible plastic netting material and polymeric filter media;
moving the multilayer of flexible plastic netting material and polymeric filter media to a pleater;
pleating the multilayer of flexible plastic netting material and polymeric filter media to form a pleated composite layer of flexible plastic netting material and polymeric filter media having an overall structure of continuous and adjacent pleated folds;
moving a length of the pleated composite layer to a filter element pre-former;
by the filter element pre-former, compressing peripheral edges of the length of the pleated composite layer to form a preformed pleated filter element;
moving the preformed pleated filter element to an assembly and sealing unit and combining the preformed pleated filter element with a preformed filter mounting element, the preformed filter mounting element being semi-rigid and molded from a plastic material, the preformed filter mounting element including:
a filter mounting connector; and
a plenum devoid of the pleated filter element, the plenum defining a free volume between the filter mounting connector and the pleated filter element allowing passage of unrestricted inhaled air through the filter mounting connector after the inhaled air has passed through the polymeric filter media of the filter,
the assembly and sealing unit having a mold configuration conforming generally to contours of the preformed filter mounting element, the mold configuration having an upper mold and a lower mold; and
by the upper mold and the lower mold:
melting and pressing together a flange formed by a plastic material of the preformed pleated filter element and a flange formed by the plastic material of the preformed filter mounting element,
thereby to join and bond together, by the melting of the plastic material of the preformed pleated filter element and the plastic material of the flange, the flange of the filter element and the flange of the preformed filter mounting element,
thereby forming an air impermeable seal extending around a periphery of the filter.

19. The method of claim 18, wherein the length of the pleated composite layer is a length separated from a longer length formed by the pleating of the multilayer of flexible plastic netting material and polymeric filter media.

20. The method of claim 18, wherein the filter is a substantially rectangular filter.

21. The method of claim 18, wherein the layer of polymeric filter media is made of or includes polypropylene.

22. The method of claim 18, wherein the layer of polymeric filter media includes carbon particles embedded therein.

23. The method of claim 18, wherein the layer of polymeric filter media includes an electrostatically charged melt blown filter layer.

24. The method of claim 18, further comprising applying a first cover to a first side of the pleated composite layer.

25. The method of claim 24, further comprising providing a second cover to a second side of the pleated composite layer.

26. The method of claim 18, wherein the preformed filter mounting element is provided as a discrete or precut filter mounting element.

27. The method of claim 18, wherein the preformed filter mounting element is provided from a series of preformed filter mounting elements embodied in a continuous plastic layer.

28. The method of claim 18, wherein the filter mounting connector includes a preformed plastic material shaped to define a bayonet of the filter, the bayonet enabling direct mounting of the filter to a face piece or the respirator.

29. The method of claim 28, wherein the bayonet includes a mounting aperture surrounded by one or more locking formations for direct mounting of the filter to the face piece or the respirator without intervention of a filter cartridge or filter capsule.

30. A filter comprising:
a pleated filter element comprising:
a layer of flexible plastic netting material having a plurality of perforations allowing free passage of air through the perforations of the plastic netting material;
a layer of polymeric filter media for filtering impurities in air passing through the filter;
the layer of flexible plastic netting material and the layer of polymeric filter media positioned to lie one on top of the other to form a multilayer of flexible plastic netting material and polymeric filter media, the multilayer of flexible plastic netting material and polymeric filter media forming a pleated composite layer of flexible plastic netting material and polymeric filter media having an overall structure of continuous and adjacent pleated folds; and
a flange having a bottom most flange surface;
a preformed filter mounting element for mounting of the filter to a face piece or a respirator, the preformed filter mounting element being semi-rigid and molded from a plastic material, the preformed filter mounting element comprising:
a mounting connector having one or more locking formations portions around a mounting aperture, wherein the mounting connector is for mounting the filter to the face piece or the respirator; and
a plenum devoid of the pleated filter element, the plenum defining a free volume between the mounting connector and the pleated filter element within the preformed filter mounting element for allowing passage of unrestricted inhaled air into the face piece or the respirator after the inhaled air has passed through the pleated filter element of the filter; and
a flange having an uppermost surface of the preformed filter mounting element; and
an air impermeable seal extending around a periphery of the filter, the air impermeable seal including and bonded by melted plastic material of the pleated filter element and melted plastic material of the plastic material of the preformed filter mounting element, wherein the bottom most flange surface is configured to contact the uppermost surface of the preformed filter mounting element to form the air impermeable seal.

* * * * *